No. 717,661. PATENTED JAN. 6, 1903.
J. DE D. TEJADA.
ACETYLENE GAS GENERATOR.
APPLICATION FILED AUG. 12, 1901.
NO MODEL. 2 SHEETS—SHEET 1.
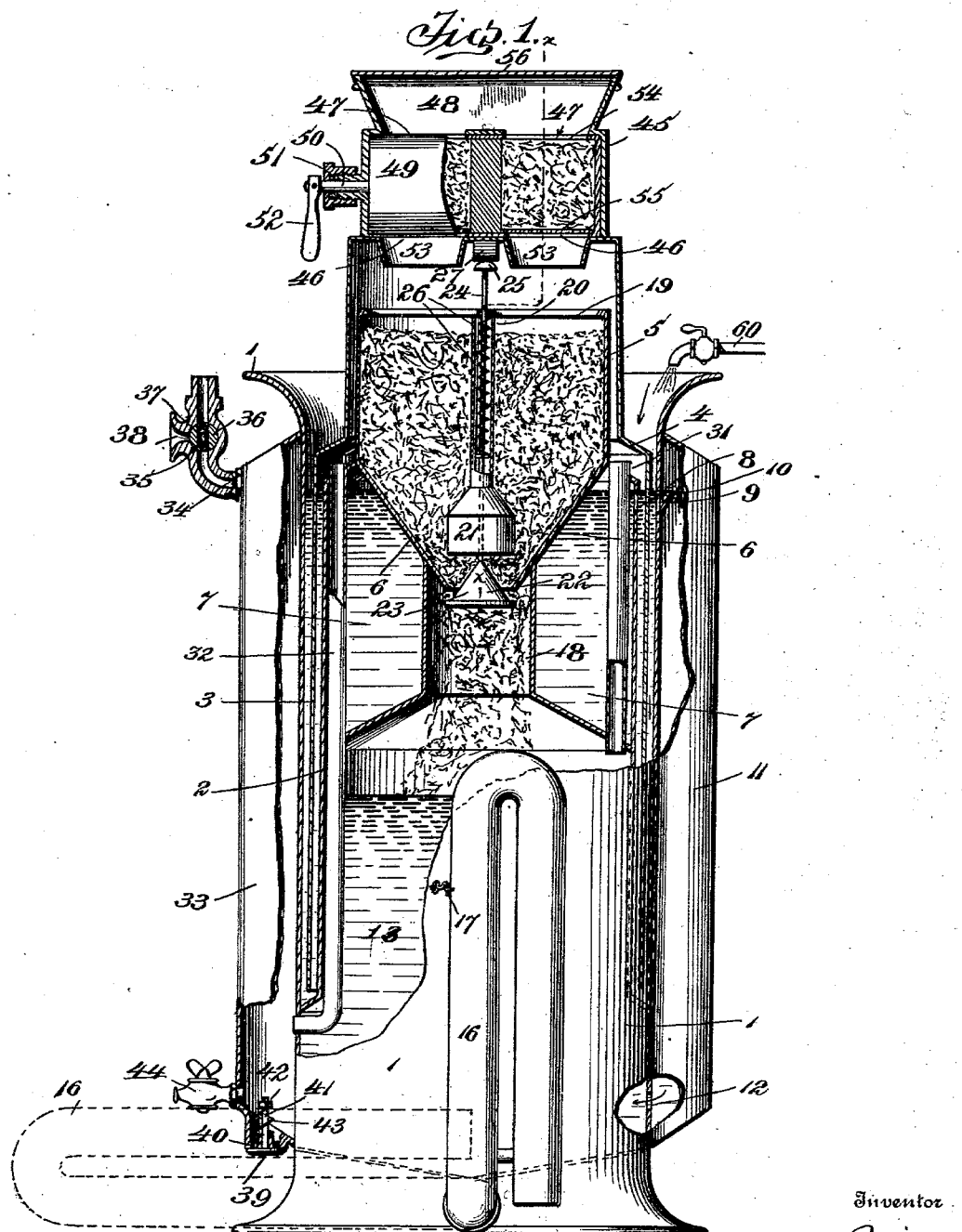
Witnesses
Inventor
Juan de Dios Tejada
By Mason Fenwick Lawrence
his Attorneys No. 717,661. PATENTED JAN. 6, 1903.
J. DE D. TEJADA.
ACETYLENE GAS GENERATOR.
APPLICATION FILED AUG. 12, 1901.
NO MODEL. 2 SHEETS—SHEET 2.
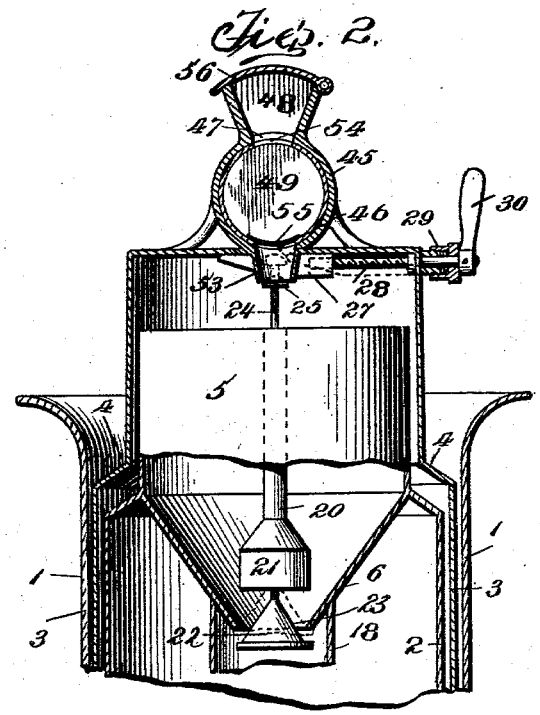
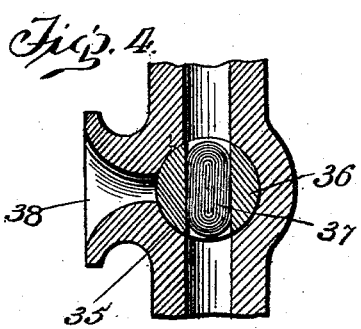
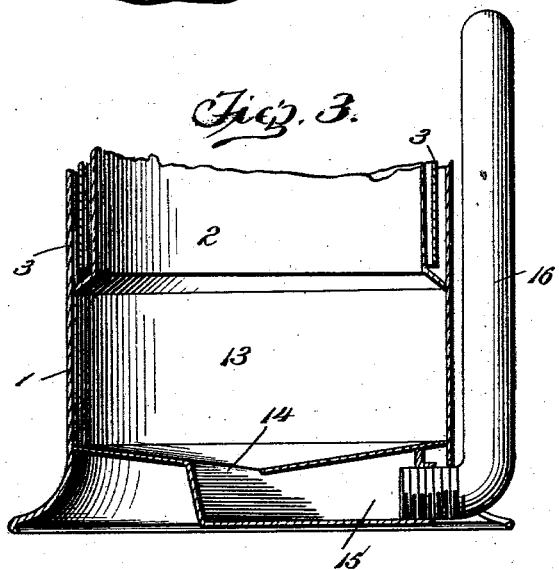

UNITED STATES PATENT OFFICE.

JUAN DE DIOS TEJADA, OF HAVANA, CUBA.

ACETYLENE-GAS GENERATOR.

SPECIFICATION forming part of Letters Patent No. 717,661, dated January 6, 1903.

Application filed August 12, 1901. Serial No. 71,803. (No model.)

*To all whom it may concern:*

Be it known that I, JUAN DE DIOS TEJADA, a citizen of the United States, residing at Havana, in the Province of Havana, Cuba, have invented certain new and useful Improvements in Acetylene-Gas Generators; and I do hereby declare the following to be a full, clear, and exact description of the invention, such as will enable others skilled in the art to which it appertains to make and use the same.

This invention relates to improvements in acetylene-gas generators, and has for its object the production of a generator in which the calcium carbid is automatically fed to water dropping or plunging into the same, the quantity of carbid fed being proportionate to the pressure of the gas within the generator, the device being also constructed so that a proper quantity of water will be maintained within the same, while the device may be cleansed from time to time by blowing off the carbid sediments without stopping the operation of the generator, the gas produced being dried and filtered or purified before leaving the apparatus.

It consists in certain novel constructions, combinations, and arrangements of parts, as will be hereinafter fully described and claimed.

In the accompanying drawings, Figure 1 represents a side elevation of my gas-generator, a portion of the same being broken away and shown in section. Fig. 2 is a vertical central section through the upper portion of the generator, taken upon a plane at right angles to the plane of the sectioned portion of Fig. 1. Fig. 3 is a detail central sectional view through the lower portion of the generator, taken upon the line of the siphon-outlet. Fig. 4 is an enlarged detail sectional view through the outlet filtering-cock through which the gas has to pass in leaving the apparatus.

In developing this invention in practical form I provide an outer inclosing casing 1, which is formed with an inner shell 2, extending into the upper open end of the casing 1 about two-thirds of the distance from the top to the bottom thereof, the said inner shell being flared outwardly at its lower end and connected with the casing 1, so as to form an annular sealing-recess 3 for receiving the lower portion of the gas-holder 4. The upper end of the inner shell 2 is drawn inwardly to some extent and supports a carbid-holder 5. The lower end of the carbid-holder 5 is funnel-shaped, as at 6, and extends into the shell 2 some little distance. Below the carbid-holder and interiorly of the shell 2 is formed an annular chamber 7, adapted to hold water. The water-chamber 7 is connected with the shell-recess 3 by means of an aperture 8, arranged in the inner shell 2 near the upper end thereof. Opposite the aperture 8 is formed another aperture 9 in the outer shell or casing 1 of the apparatus, this aperture being somewhat guarded by an outwardly-projecting lip, as at 10.

Upon one side of the casing 1 is arranged a closed passage-way 11, which extends nearly the entire length of the casing 1. Its upper end covers the aperture 9, and when water overflows through the same it conducts the said water to a point near the bottom of the apparatus, where an aperture 12 is formed in the casing 1, by which the water may be introduced into the bottom of the apparatus, which forms a separate generating-chamber. The bottom of the water-chamber 13 is preferably formed so as to drain toward a central outlet 14, formed near the center thereof and leading into an outlet-passage 15, formed beneath the floor of the water-chamber 13. A U-shaped pipe or siphon 16 enters the chamber 15 at one end and extends upwardly outside the casing 1 to a suitable point and thence downwardly again to a point adjacent to its other end. This outer end of the siphon is open, and the bend in the pipe or siphon 16 regulates the height to which the water rises in the chamber 13. The siphon-pipe 16 is connected with the outlet-passage chamber 15 in such a manner that it may be turned downwardly, as indicated in dotted lines in Fig. 1. When it is wished to flush the bottom of the chamber 13, the siphon 16 is turned downwardly to the position shown in Fig. 1, which causes the water to run into the descending leg of the said siphon, after which the siphon is quickly raised to its vertical position again. This causes the water which has entered the descending leg of the siphon to run out of the same with sufficient force to form a vacuum behind it, and through the siphon action thus set up the water in the chamber 13 will be caused to flow out through the siphon-pipe 16 with considerable force, dropping into the passage 15 and carrying the sediment with it. The water will continue to run out through the siphon until the level of the water reaches the aperture 12, at which time the pressure inside the water-chamber will be so reduced that the siphonic action will cease in the pipe 16, the siphon being broken from the outside. The aperture 12 will be opened sufficiently to permit some atmospheric air to enter the water-chamber, which will destroy the vacuum at that point. The water in the ascending leg of the siphon-pipe 16 will then run back into the water-chamber, raising the level of the water therein immediately to the height above the opening 12 and sealing the same again, thereby preventing the escape of gas through the said aperture. When the flushing action is in progress, the water is usually introduced into the apparatus through any suitable means—as, for instance, a faucet 60, which may be arranged to overhang the upper flared edge of the casing 1. The inflow of water will be continued after the siphonic action through the pipe 16 ceases and until the normal level of the water in the chamber 13 is established again. The water-chamber is usually flushed when gas is not being generated, so that the pressure in the water-chamber is so expanded as to almost form a vacuum in said chamber before the flushing operation ceases. The siphon-pipe 16 is locked in its vertical position by means of a suitable hook, as 17, so that it cannot become accidentally displaced when it is desired to clean out the water-receptacle. The movable joint connecting the siphon-pipe 16 to the outlet-chamber 15 is suitably packed, so that there will be no leakage at this point. The action of the siphon-pipe in maintaining the water-level in the chamber 13 will be readily seen, since the water will rise in the said pipe as rapidly as it rises in the chamber, and when the water in the pipe reaches the U-shaped bend therein it will drain out through the open downwardly-extending portion thereof. The water in the chamber 13 can therefore not rise higher than the bend in the siphon tube or pipe 16. Water is fed into the said apparatus by pouring it into the flaring upper end of the casing 1 between the said casing and the gas-holder 4. The water will fill the recess 3, which receives the gas-holder, and passing through the aperture 8 will fill the inner annular water-compartment 7 until the water therein has reached the height of the aperture 8. After this when more water is introduced it will rise high enough to flow over the lip 10 from the aperture 9 and thence downwardly through the passage-way 11 on the side of the casing 1 and into the chamber 13 through the aperture 12. The water will rise, as before stated, in the said chamber 13 until the bend of the siphon-pipe 16 is reached, after which, of course, it will run out of the said pipe. By introducing a sufficient amount of water into the top of the casing 1 the height of the water in the chambers 13 and 7 will be automatically maintained at the levels indicated in Fig. 1 of the drawings. The water in the lower receptacle 13 is used for forming with the carbid the acetylene gas, while the water in the upper receptacle of the apparatus is used to form a gas-holding seal.

A sufficient space is left inside the annular chamber 7 at 18 to permit of a proper quantity of carbid being introduced into the water-chamber 13 from time to time. This recess 18 receives the lower end of the funnel-shaped bottom 6 of the carbid-holder 5. The upper end of the carbid-holder is open, but is strengthened by means of a spider 19, formed of cross-bars extending from side to side, the said cross-bars at their centers supporting a valve-holding tube, as 20. The tube 20 extends downwardly through the central portion of the carbid-holder and is formed with an annular flaring end portion, as 21, which is arranged to fill considerable of the space at the lower end of the funnel 6. The enlarged end 21 of the said tube operates to prevent the carbid from resting upon a carbid-delivering valve 22 at the lower end of the carbid-chamber with too great a weight.

The valve 22 is cone-shaped and is formed with a lower projecting annular flange 23, so that it cannot be drawn into the carbid-chamber too far. The cone 22 extends upwardly into the open end of the funnel 6 and allows more or less carbid to pass out of the end of the funnel, according as the said valve is depressed to a greater or less degree. The valve 22 is secured to the lower end of the valve stem or rod 24, which projects upwardly through the hollow tube 20 and to a point not far below the horizontal top of the gas-holder 4. The upper end of the valve-stem 24 is preferably provided with a head or knob 25, preferably rounded upon its upper surface. A coil-spring 26 surrounds the valve-stem for a portion of its length and is secured at its upper end to the spider 19, while at its lower end it is secured to the valve-stem 24 or a projection formed thereon. The spring is so arranged as to normally draw the valve 22 upwardly against its seat at the lower edge of the carbid-holder funnel. It will be apparent that if the pressure of gas in the holder decreases considerably the top of the holder can descend until means carried thereby, as will be hereinafter fully described, engages and pushes the valve-stem downwardly, thus opening the valve 22 and dropping more carbid into the water, so that fresh gas will be instantly generated and, passing into the gas-holder, will raise the same again. The introduction of carbid is thus automatically regulated in exact accordance with the amount of gas drawn from said gas-holder.

In order to start the operation of the apparatus before any gas has been formed, I employ a sliding bolt or wedge 27, arranging the same upon the inner surface of the top of the gas-holder and in such a manner that when it is reciprocated it will pass over the upper end of the valve-stem 24, engaging the button 25 thereon. This wedge 27 is connected by means of a swivel-joint with a screw 28, one end of the screw passing out through the side of the gas-holder and through a packing-gland 29, receiving an operating-handle 30 on its outer end, by means of which it may be turned. The packing-gland 20 prevents the escape of gas at this point. When it is desired to start the operation of the apparatus, a suitable quantity of carbid having been put in the carbid-holder 5, the screw 28 is rotated by means of the handle 30 until the wedge 27 has been forced along over the upper end of the valve-stem 24, the thickest portion of the said wedge operating to open the valve 22 and introduce carbid into the water-chamber 13. The valve may thus be held open a suitable length of time to introduce a proper quantity of carbid into the water, after which the screw 28 is reversed and the wedge 27 retracted, as indicated in dotted lines in Fig. 2. After the generation of gas has once been started the continuous feeding of the carbid will continue automatically, as above described.

The gas which is generated by bringing the carbid into contact with the water in the chamber 13 is led from the upper part of the said chamber through a pipe 31 upwardly through the annular water-chamber 7 to the interior of the gas-holder 4. The gas will then be permitted to escape from the holder through a pipe 32, which passes downwardly through the water-chamber 7 and the water-chamber 13 and opens into a gas receiving and distributing chamber 33. This chamber 33 extends nearly the full length of the casing 1 and at the upper end is provided with an outlet, as at 34, which is controlled by means of a filtering-cock 35. The cock 35 is formed with a turn-plug 36, having a port formed therein extending diametrically through the same. The aperture formed in this plug 36 is filled with filtering means, preferably a piece of wire-gauze 37, rolled upon itself a number of times, as clearly shown in Fig. 4 of the drawings. The gas passing from the generator, no matter how dry it may have been rendered, will carry more or less lime in the form of very fine dust, which lime will operate to clog the pipe carrying the gas if it is permitted to pass into the same. By forcing the gas to pass through the gauze the lime which is carried by it will be left in the gauze. In order to clean the gauze from time to time if it gets choked, I form the casing of the cock or valve 35 with a lateral opening 38, so that when the plug 36 is turned at right angles to this open position the gas will not only be checked in its flow from the generator, but the folded gauze may be withdrawn from the plug 36 through the said opening 38. Since the gauze is preferably in the form of a long flat strip folded upon itself many times, it is only necessary to unfold the said gauze in order to be able to thoroughly clean it. After it has been cleansed it may be folded again and inserted in the plug 36, when it will be ready for use again in detaining the lime carried by the gas. The lower end of the gas-receptacle 33 is preferably provided with a safety-valve 39, said valve being in the form of a flat disk adapted to rest against a valve-seat 40, formed at the bottom of the said chamber 33.

Suitable apertures pass through the valve-seat, so that the pressure of the gas inside the chamber may act to some extent upon the inner surface of the valve-disk 39. The valve is provided with a stem 41, which passes through a suitable bearing into the interior of the chamber 33 and is provided with a nut 42 on its inner end, between which and the bearing of the valve-stem is interposed a spring 43, of suitable power, for normally holding the valve closed against the pressure of the gas. The tension of the spring may be regulated to some extent by the nut 42. The spring is made strong enough to normally hold the valve closed under any ordinary pressure of gas; but when the pressure of gas becomes excessive the valve will yield and permit the gas to escape at this point, thus relieving undue pressure which might be brought to bear upon the apparatus. The gas-chamber 33 may also be provided with a draw-off cock, as 44, at its lower end, if desired.

The means for introducing fresh charges of carbid into the carbid-holder 5 without stopping the operation of the apparatus or permitting of the escape of gas also forms an important feature of the present invention. Upon the top of the gas-holder 4 is arranged a horizontal cylinder or valve casing, as 45, which is provided with openings 46 46, leading into the top of the gas-holder 4, and diametrically-opposed openings 47 47, leading into a charging-hopper 48, formed on the top of the horizontal cylinder 45. Within the cylinder 45 is a rotating cylinder 49, forming the valve for receiving and introducing fresh carbid through the top of the gas-holder. This cylinder 49 is preferably made to fit the cylinder-casing 45 very snugly, a gas-joint being formed between the same to prevent any gas escaping from the holder. A spindle or stem 50, secured to the valve-cylinder 49, projects outwardly through a packing-gland 51 and receives an operating-handle 52 at its outer end, by which it and the valve-cylinder 49 may be rotated.

Funnels 53 are preferably arranged below the openings 46, so that the carbid is directed when it falls into the top of the carbid-holder 5. As shown in the drawings, there may be two of these openings and two carbid-compartments corresponding therewith in the valve-cylinder 49, and there may be only one; but a greater number may be used, if desired, all within the spirit of the present invention.

Elongated openings 54 are formed in the valve-cylinder 49, which are adapted to be brought into coincidence with either opening 46 or 47 of the casing 45. Diametrically opposed to these openings 54 in the cylinder are formed other openings, which, however, are closed by means of pieces of glass or mica or any suitable transparent material, as at 55, so that the interior of the charging mechanism may be inspected from time to time without the escape of gas.

The hopper 48 is preferably formed with a hinged cover 56, which is normally closed to keep out rain and snow and otherwise protect the mechanism at this point. When it is necessary to introduce fresh carbid into the carbid-holder 5, the valve-cylinder 49 is turned by means of the handle 52, so that its elongated openings 54 will be brought uppermost and in coincidence with the openings 47 in the bottom of the hopper 48. The carbid is then introduced into the said hopper until the hollow cylinder 49 is filled therewith, after which the said cylinder or valve is turned until the openings 54 are brought immediately above the apertures 46 in the top of the gas-holder. The carbid in the said cylinder 49 will thus be permitted to fall into the top of the carbid-holder 5 without allowing any gas to escape from the said holder. The interior of the holder and the charging-valve can be inspected at this time through the glazed openings 55 in the cylinder-valve 49, they being at this time in coincidence with the openings 47 of the hopper.

From the above description it will be evident that my improved apparatus is not only capable of constantly generating acetylene gas, but that the feeding of the necessary carbid to the water therein is automatically controlled according to the consumption of the gas generated and that fresh carbid can be supplied to the carbid-holder from time to time without stopping the operation of the apparatus or opening the same, so as to permit of any escape of gas. The passing of the gas through the holder 4 above the open carbid-chamber 5 is an important feature of the invention, since the carbid is well known to absorb moisture rapidly, and the gas being thus permitted to fill the space over the carbid when passing from the pipe 31 to pipe 32 becomes thoroughly dried while it is in the gas-holder. It will be further seen that the apparatus is thoroughly safe, since the valve 39 prevents the chance of great pressure accumulating in the apparatus. The gas is also well filtered as it passes through the filtering-cock 35.

Having now described my invention, what I claim as new, and desire to secure by Letters Patent, is—

1. A gas-generator comprising a casing, a gas-holder mounted therein, means for sealing the gas-holder with water, a carbid-holder arranged within the gas-holder, a valve controlling the discharge of carbid from said holder, means for automatically regulating the position of said valve relative to the gas-pressure within said gas-holder, and a movable wedge designed to be moved into contact with the valve-operating mechanism for imparting the initial movement to said valve, substantially as described.

2. A gas-generator comprising an outer casing, a gas-holder mounted therein, a water-compartment formed beneath said gas-holder, a carbid-holder supported above the water receptacle or compartment and within said gas-holder, a valve for controlling the discharge of carbid from said holder, having a valve-stem projecting upwardly therefrom in suitable proximity to the top of the gas-holder, means for normally holding the valve in its closed position, means designed to be moved laterally over the upper end of said valve-stem for imparting the initial movement thereto, the structure being such that when the valve has once been opened the pressure of gas in the holder will permit the holder to move downwardly into contact with the valve-stem for increasing the discharge of carbid or lift said holder out of contact therewith for decreasing the said discharge, substantially as described.

3. A gas-generator comprising a casing, a water-receptacle mounted therein, a carbid-receptacle arranged above the same, a valve for controlling the discharge of carbid into said water-receptacle and having a valve-stem projecting upwardly therefrom, a gas-holder inclosing said carbid-holder, a horizontally-arranged, reciprocating wedge carried by the top of the gas-holder, adapted to engage the top of the valve-stem, and a screw for forcing the wedge back and forth, whereby the valve may be given its initial movement, substantially as described.

In testimony whereof I hereunto affix my signature in presence of two witnesses.

JUAN DE DIOS TEJADA.

Witnesses:
JOSÉ ABELEIRA CARRIL,
ALFREDO PÉREZ RAMOS.